United States Patent [19]

Edwards et al.

[11] Patent Number: 5,745,230
[45] Date of Patent: *Apr. 28, 1998

[54] OPHTHALMIC LENS INSPECTION SYSTEM AND METHOD

[75] Inventors: Russell J. Edwards; James A. Ebel, both of Jacksonville, Fla.; Borge Peter Gundersen, Tikob; Thomas Christian Ravn, Helsingor, both of Denmark

[73] Assignee: Johnson & Johnson Vision Products, Inc., Jacksonville, Fla.

[*] Notice: The term of this patent shall not extend beyond the expiration date of Pat. No. 5,394,988.

[21] Appl. No.: 681,639

[22] Filed: Jul. 29, 1996

Related U.S. Application Data

[63] Continuation of Ser. No. 547,073, Oct. 23, 1995, abandoned, which is a continuation of Ser. No. 994,249, Dec. 21, 1992, abandoned.

[51] Int. Cl.$^6$ .................................................. G01B 9/00
[52] U.S. Cl. ........................................ 356/124; 206/5.1
[58] Field of Search .................................. 356/124–127, 356/237, 239, 240, 430, 244, 246; 264/2.6; 250/572, 223 B, 562; 358/101, 106, 107; 382/8, 65; 206/5.1, 562, 563

[56] References Cited

U.S. PATENT DOCUMENTS

| 3,666,885 | 5/1972 | Hemsley et al. | 356/23 |
|---|---|---|---|
| 3,820,899 | 6/1974 | McComark | 356/124 |
| 3,988,068 | 10/1976 | Sprague | 356/124 |
| 4,002,823 | 1/1977 | Van Oosterhout | 356/237 |
| 4,317,613 | 3/1982 | Grosser | 350/89 |
| 4,680,463 | 7/1987 | Lutgendorf et al. | 356/240 |
| 4,733,360 | 3/1988 | Kobayashi et al. | 364/507 |
| 4,815,844 | 3/1989 | Schmalfuss et al. | 356/237 |
| 4,817,166 | 3/1989 | Gonzalez et al. | 382/1 |
| 5,080,839 | 1/1992 | Kindt-Larsen | 264/2.6 |
| 5,081,685 | 1/1992 | Jones, III et al. | 382/1 |
| 5,094,609 | 3/1992 | Kindt-Larsen | 425/445 |
| 5,394,988 | 3/1995 | Edwards et al. | 206/5.1 |

FOREIGN PATENT DOCUMENTS

| 2057832 | 6/1992 | Canada. | |
|---|---|---|---|
| 0 063 761 | 11/1982 | European Pat. Off.. | |
| 79 19148 | 3/1980 | France. | |
| 3432002 C2 | 11/1987 | Germany. | |
| 0134339 | 10/1980 | Japan | 356/124 |
| 59-108934 | 6/1984 | Japan. | |
| 59-160734 | 9/1984 | Japan. | |
| 2-257007 | 10/1990 | Japan. | |
| 2171812 | 9/1986 | United Kingdom. | |

*Primary Examiner*—Hoa Q. Pham

[57] ABSTRACT

A lens inspection method and apparatus comprising a pallet having wells for receiving one or more lens containers at the receiving point. A conveyor achieves uniformity of pallet motion when transporting the lens. The pallet wells includes holes that pass through the pallet. These holes, along with a side driven transport system, make possible an arrangement of a lamp and camera on opposite sides of the lens for capturing an image of a lens. A computer implemented algorithm processes the digitized image to determine the acceptability of the lenses. A lens disposition mechanism uses a signal generated by the computer and indicates lens acceptability to disposition the lens by physically separating a container with an acceptable lens from an unacceptable lens. After disposition of containers, the pallet is returned by conveyor to the lens receiving point.

22 Claims, 4 Drawing Sheets

OPHTHALMIC LENS INSPECTION SYSTEM AND METHOD

This is a continuation of application Ser. No. 08/547,073, filed Oct. 23, 1995 which is a continuation of Ser. No. 07/994,249, filed Dec. 21, 1992, both abandoned.

BACKGROUND OF THE INVENTION

Previously devised systems for the inspection of ophthalmic lenses, especially molded hydrophilic contact lenses, employed human inspection utilizing trays having a rectangular array of wells in which the lenses were submerged in saline solution.

In these systems, the tray containing lenses and saline is transferred to an inspection station attended by a human operator. When the tray is placed in the inspection station, a viewing assembly is positioned above a first well. The lens in the well is illuminated from below and an image is transferred by the viewing apparatus and projected upon a screen at the inspector's eye-level. The inspector manually varies the field-of-focus to examine different depths of the lens.

After looking for the appropriate lens characteristics and deviations from accepted standards, the human inspector makes a decision as to whether the lens is acceptable. The inspector often finds it is useful to move or displace the lens slightly relative to the tray well in which it is contained, or to otherwise disturb the saline solution in order to distinguish between foreign particles in the saline and imperfections in the tray well from characteristics or defects of the lens.

The inspector enters his decision by pushing the appropriate electrical switch to indicate that the lens is either acceptable or to be rejected. The viewing mechanism then indexes over to the next well in the tray where the inspection procedure is repeated. As can be appreciated, certain time constraints must be placed upon the inspector such that if a decision is not made within a predetermined amount of time, the lens is automatically considered defective, and the viewing apparatus indexes to the next well. Likewise, lenses that may otherwise be acceptable but are accompanied by extraneous pieces of foreign material or if two lenses are found in the same well, the situation is considered unacceptable and the contents of the well rejected.

Upon the completion of the inspection of an entire tray of lenses, the inspector activates another electrical switch to initiate disposition of the lenses of the tray just inspected. A disposal unit visits each well of the tray where an unacceptable lens was indicated to suction out and dispose of those lenses. The tray is then transferred along for the packaging of the acceptable lenses.

Although the inspectors are highly trained and are given objective criteria by which to judge the quality and ultimate acceptability of the lenses, one skilled in the art can appreciate that human inspection leaves much to be desired. Human inspectors lack inspector-to-inspector uniformity, and repeatability by a single inspector may be lacking based on the inspector's mental condition and accumulated fatigue. An ophthalmic lens manufacturer, therefore, conservatively rejects many lenses that are acceptable on an objective basis because of limitations in the inspection process.

To increase uniformity and decrease the number of falsely rejected lenses, an automated inspection system can be implemented where an image of the lens to be inspected is captured using a strobe lamp and a camera and the image then digitized and processed by a computer to make a determination whether the lens is acceptable.

There are with such a system, however, a number of requirements particular to this type of automated inspections that are not found when using human inspection.

Because of the limited field-of-view of a camera system, and the desire to utilize the field to the maximum extent, it is important that the lens be centered in the field while it is being carried so that lenses are found in a repeatable position from one lens to the next.

Due to the manner in which an image is captured by the camera, a second requirement is that the image be as clear as possible and not blurred by external vibrations, either of the lens or the deionized water in which it is placed. For this reason, it is necessary that the transport system carrying the container in which the lens is found, travels as uniformly as possible in the direction in which the lens is traveling and is stationary in the two orthogonal directions.

Both of these requirements must be met while permitting the lamp and camera to be positioned to allow the camera to capture a high quality image of the lens. It is preferable that the above objectives be achieved while the lamp and camera are on opposite sides of the lens, allowing the light to pass through the lens, an image to be captured by the camera and then digitized. These requirements mandate that the mechanism for holding and moving the lenses be located substantially to the sides of the lens travel path in order not to obstruct the light from the lamp from which the image is captured.

A further object of the present invention is to provide a receptacle for receiving one or more contact lens containers that can then be transported by a conveyor to an inspection station comprising the lamp and camera.

SUMMARY OF THE INVENTION

The above objects are achieved by a system and method for use in conjunction with a computer-based inspection apparatus that analyzes a digitized image of an ophthalmic lens. A lens pallet is provided having wells for receiving one or more lens containers at the receiving point.

The conveyor of the present invention achieves the requisite uniformity of motion needed in the direction of pallet travel and stability when transporting the lens in the orthogonal, non-translating directions by use of one or more guide rails.

In one embodiment, the pallet is restrained between the rails, except in the direction of travel, by mechanical bias means such as spring-loaded roller balls located on the side walls of the pallet body which cooperate with guide rails on the conveyor positioned to compress the mechanical bias means when the pallet is between the guide rails. Engagement means on the pallet are also provided for engaging a drive means which transports the pallet through the inspection station.

In another embodiment, the pallet is restrained against a single guide by means of the drive device. The device moves against the guide rail by means of an L-shaped arm. The drive means is then activated and allows the L-shaped arm to slide along the pallet edge. As the arm slides, it engages the rear edge of the pallet and pulls the pallet in the desired direction of travel for inspection.

The pallet wells for receiving the containers comprise holes that pass through the pallet. These holes along with the above-described guide and transport system make possible an arrangement of the lamp and camera for capturing an image of a lens that maximizes utilization of the field-of-view of the camera and minimizes blurring.

A computer implemented algorithm then processes the digitized image according to rules set forth in a computer program to determine the acceptability of the lenses.

A lens disposition mechanism connected to the computer uses a signal generated by the computer and indicates the lens acceptability determination to disposition the lens by physically separating an acceptable lens from an unacceptable lens.

In the preferred embodiment, the containers holding the lenses are removed from the pallet and sent along different paths so that a failure to remove a container from the pallet does not result in the passing of an unacceptable lens. After disposition of containers, the pallet is returned by conveyor to the lens receiving point.

DESCRIPTION OF THE PREFERRED EMBODIMENT

Figure 1:
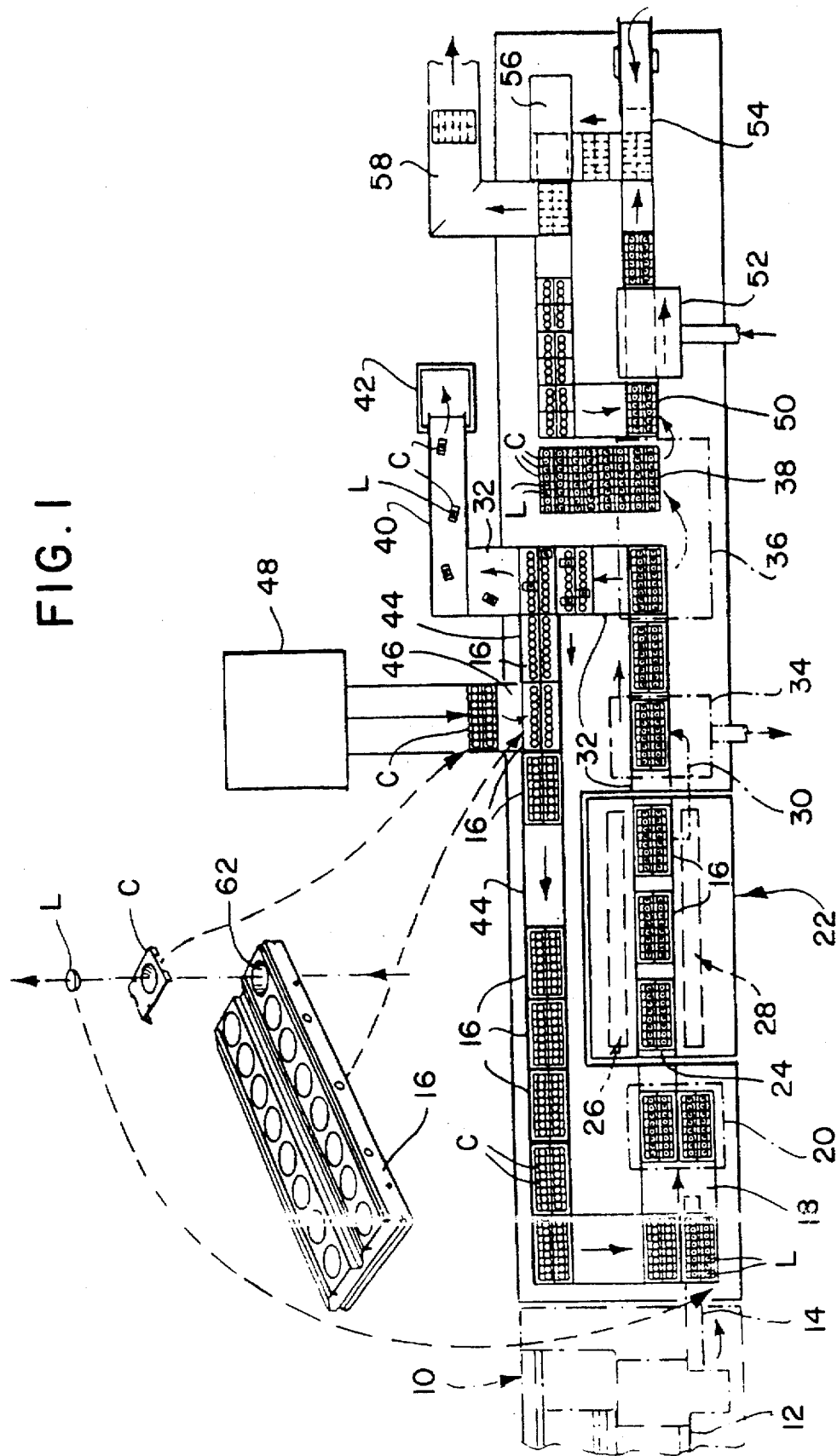
FIG. 1 is a top planar flow schematic of the apparatus of the present invention shown in relationship with associated equipment.

Turning now to FIG. 1, shown is the present invention in relationship with the apparatus preceding and following the inspection apparatus of the present invention. Lenses are received from a hydration line 10 wherein the lenses produced are hydrated by repeated or extended exposure to deionized water. The hydration apparatus and process are, respectively described more fully in U.S. Pat. Nos. 5,094, 609 and 5,080,839.

After completing hydration, the lenses within the hydration chambers (not shown) travel down line 12 which delivers the lenses in the chambers to a pick and place unit 14, of the type such as the Adept One Industrial Robot, made by Adept Technology, San Jose Calif.

This pick and place unit 14 removes the lenses from the hydration chambers and places them into containers (not shown) residing on a transport pallet 16.

A more detailed description of the preferred embodiment of the lens package is given in copending U.S. application Ser. No. 995,607 filed concurrently with this application.

The lenses then travel in the container on the pallet down track 18 until they arrive at a second pick and place unit 20. This unit is of the type such as the Hauser Motion Control HLE 80 (Upper St. Clair, Pa.) for horizontal movement and Festo Corp. Rotating Cylinder, DSR-25-180-P, Hauppauge, N.Y. for vertical movement. At this point, the pallets are removed from track 18 and placed into an inspection station 22. If preferred, a buffer unit may be added between the lens loading area and the inspection station to accommodate different operating rates of the two units. The inspection station 22 comprises a conveyor for transporting the pallet 24 to inspection points 26 and 28. Because the wells on the pallet are located in two parallel rows, the inspections are performed independently on the two rows of lenses contained on the pallet 16 by inspection stations 26, 28.

A more detailed description of the preferred embodiment of the illuminating system is given in copending U.S. application Ser. No. 994,388 filed concurrently with this application.

A more detailed description of the preferred embodiment of the pallet system with illumination triggering is given in copending U.S. application Ser. No. 994,242 filed concurrently with this application.

The inspection station 22 is isolated from the remainder of the automated inspection apparatus in order to eliminate adverse interactions between the inspection station and the remainder of the system that could be induced by mechanical vibrations associated with the remainder of the system.

A computer implemented algorithm then processes the image captured at the inspection points 26, 28 according to rules set forth in a computer program to find the nonconformities in the lens and therefrom determine the acceptability of the lenses.

The method of capturing an lens image with a camera and determining whether a lens is acceptable once an image is captured by the camera and reduced to digital data is described in copending U.S. application Ser. No. 993,756 filed concurrently with this application.

After undergoing the inspection procedure, conveyor 24 delivers the pallet to a third pick and place unit 30 which removes the pallets from the inspection station 22 and places it upon another transport system 32. This pick and place unit is of the same type as 20.

The pallet containing the inspected lenses moves along transport system 32 to a deionized water removal station 34. Because deionized water is not isotonic with human eye tear fluid (does not have the same salt concentration), it is necessary that the deionized water be removed. As the pallet moves along transport system 32 it encounters a lens disposition mechanism which is a fourth pick and place unit 36 which receives a signal from the appropriate inspection station 26 or 28 indicating the acceptability of the inspected lens. This pick and place unit 36 is of the same type as unit 14.

Containers, which serve as the final package containing lenses, are dispositioned by the lens disposition mechanism 36 by removal from the pallet. Containers holding unacceptable lenses are dispositioned by being placed on a rejection conveyor 40. This rejection conveyor causes the containers holding unacceptable lenses to travel down path 40 and into disposal bin 42. Those packages with acceptable lenses are dispositioned by being transferred to an accumulation rail 38. This rail acts to consolidate the packages with acceptable lenses, closing any spaces between packages left by those removed for having unacceptable lenses. This area also serves as a buffer to compensate for variations in final output. The now empty pallet moves to a return conveyor 44 where it encounters a container loading station 46.

Containers are injection molded, for example of polypropylene, at the molding station 48 and transported to station 46 to be loaded into the pallets. As the pallets return on conveyor 44 they are dosed with deionized water then proceed to the beginning of the pallet routing process described above. A buffer may be provided between the point where pallets are emptied and returned in order to match unit requirements.

Returning now to the packaging accumulation rail 38, lenses are routed to a loading station 50 and then travel to a saline dosing station 52 where the appropriate concentration of salt solution is deposited in each package, all of which now contain an acceptable lens. This may be done by adding the appropriate amount of concentrated saline solution to the deionized water, adding an amount of salt, or removing the deionized water and adding saline solution.

The container then travels to a covering station 54 where plastic coated foil is cut and placed upon the lens-containing package.

After further travel to station 56, the package is sealed by heating the plastic coated foil in a conventional manner to melt the plastic and provide a hermetic seal around the periphery of the package. After final travel to station 58, the packaged contact lenses are sent on to be sterilized, placed into secondary packages and sent to inventory.

Figure 2:
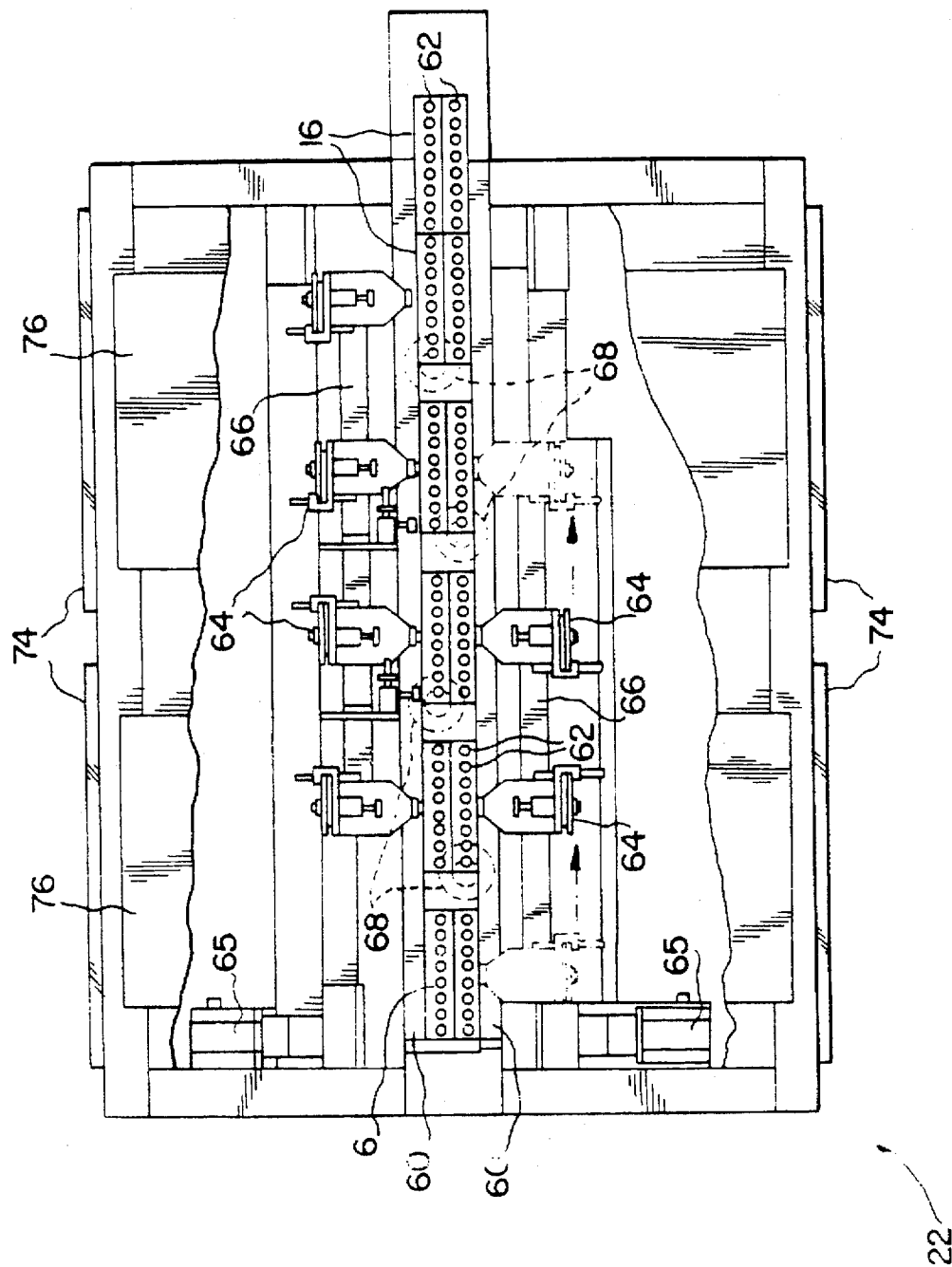
FIG. 2 is an elevational planar view of an apparatus constructed according to the present invention shown as a top planar view.

Turning now to FIG. 2, inspection station 22 is shown in mechanical detail from a top elevational planar view with like elements having like identification numerals. Identified in this drawing is pallet 16 and guide rails 60 which contain the pallet therebetween. Also discernible in this figure are the individual holes 62 passing through the pallets and within which rests the lens holding containers (not shown).

In order to move the pallets in the direction of travel uniformly and consistently and to reduce the vibration or other extraneous motion in the non-travel directions, the pallets contain mechanical bias means such as a spring-loaded roller balls located on the side walls of the pallet body which cooperate with guide rails on the conveyor positioned to compress the mechanical bias means when the pallet is placed between the guide rails 60.

Alternately to move the pallets in the direction of travel uniformly and consistently and to reduce the vibration or other extraneous motion in the non-travel direction of the pallets, a drive means and a drive device may be used. The pallet is first pushed against the guide rail by an L-shaped arm of the drive device. This constrains the pallet between the guide rail and the L-shaped arm. The pallet is then pulled in the direction of travel by the drive means via the L-shaped arm.

To transport the pallets, the conveyor system further comprises drive means 64 which engages engagement means such as blind holes located in the sides of the pallets. The drive means 64 are connected by mounting plate 66. Drive means 64 contain a movable projection activated by an air cylinder of the type such as the Festo Pneumatic Cylinder, ADV-20-10-A, Hauppauge, N.Y., which at the pallet initial position enters the blind hole engagement means in pallet 16 to engage the drive means to the pallet. The drive means 64 is powered by servo motor 65 to transport the pallets 16 smoothly and uniformly between or alternately along rails 60. This servo motor is of the type as the Berger Lahr D314-006-L servo motor and the Alpha Gear Reducer SP75-M2 from Hano Electroteknik A-S, Denmark. At the end of the travel path, the projection is retracted into the drive means 64 and the drive means returned by servo motor 65 to the initial position to repeat the cycle.

The required precision of the drive and pallet system can be derived from the physical characteristics of the lens and package, the inspection system field-of-view, lens float and triggering sensor error. These requirements can be considered independently along the orthogonal X and Y axes, the X axis being the direction of travel.

For example, with a lens having a diameter of 12.817 mm and a 14.500 mm inspection field-of-view, a combined sensor error and lens float of 1.300 mm and package tolerance of 0.083 mm would require a fixture tolerance along the Y axis to be 0.300 mm. Along the direction of travel, the X axis, however, there is no fixture tolerance consideration since the inspection is triggered by the package.

Inspection may take place at any of four camera locations 68. While four inspection locations are shown, only two may be needed to inspect the lens; that is, any two that are located on opposite rows of lenses on the pallets. Four inspection positions may be required, however, if it is desired to separately inspect different aspects of the lens, for instance an edge inspection and a center inspection or inspections at different depths of field.

A high resolution camera, such as the Kodak Videk MegaPlus camera, is used to capture an image of the lens for inspection. This camera has a field-of-view of 14.5 mm by 14.5 mm divided into a square array of 1024 pixels on a side, yielding a resolution of 14.1 µm by 14.1 µm.

Figure 3:
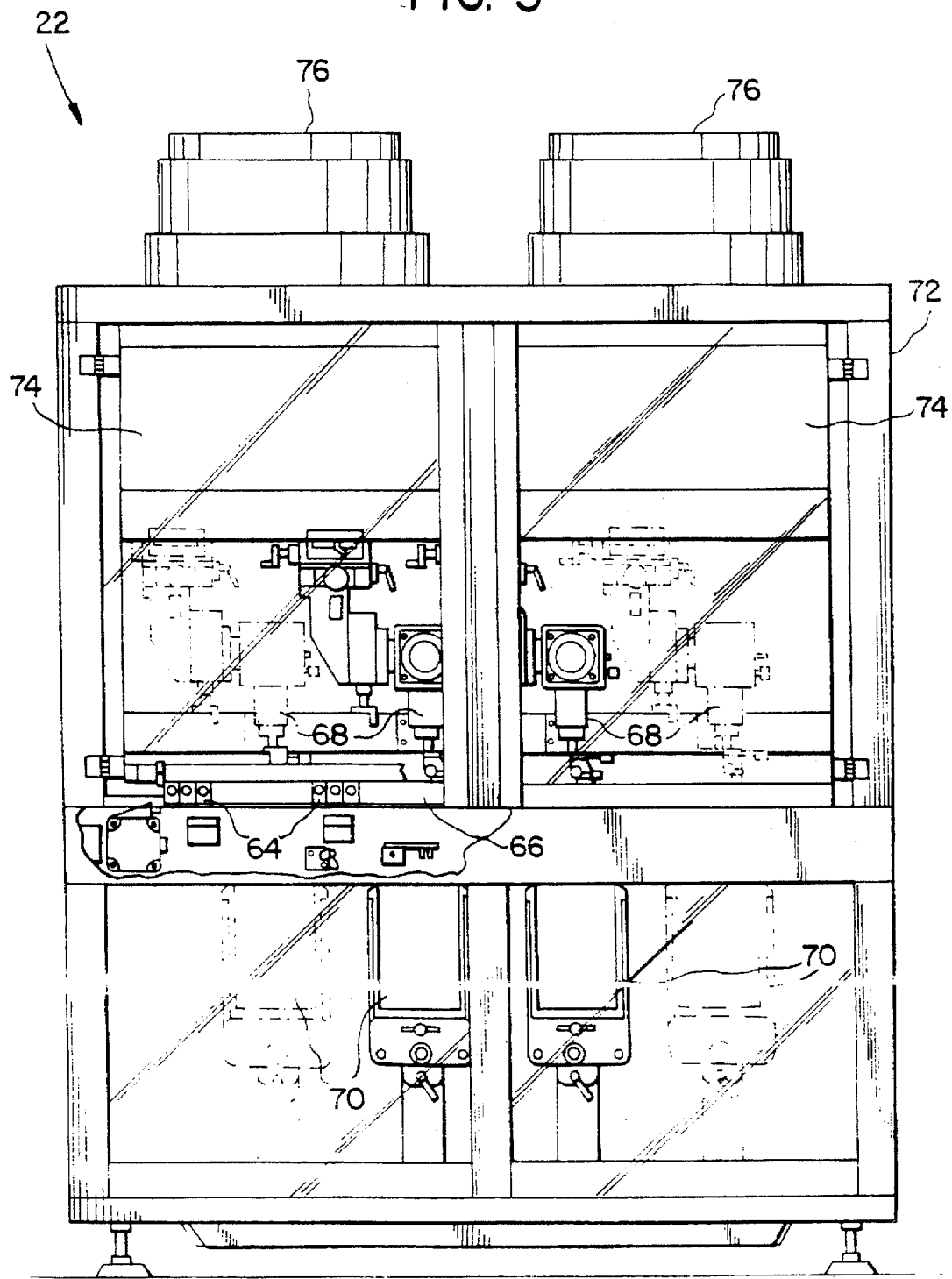
FIG. 3 is a side elevational planar view of the apparatus of FIG. 2.

Turning now to FIG. 3, a side view of the apparatus described above is shown with like elements having like identification numerals. In addition to the above described elements, there is also shown strobe lamps 70 located on the side of the lens being inspected opposite the camera, and illuminating when a triggering means on the pallet activates a sensor, schematically shown at 71, responsive to the triggering means. This lamp is of the type such as the Perceptics model LI004-VK strobe. This strobe unit uses a xenon flash tube that emits between 3 and 5 joules of radiant energy over a time period of 40 µs duration. The sensor for the package is the Keyence FS2-65 amplifier and FU-65 Fiber Optic Unit, sold by Keyence of Fair Lawn, N.J.

In addition there is shown in this figure a housing made of frame 72 and panels 74. These panels may be transparent in order for operators to view the operation of the mechanism inside the housing, or if necessary, opaque to block ambient light and prevent specular reflections and deviations in uniformity to ambient light.

The main purpose of the housing is to isolate the inspections system from air-borne dust and other particles in the environment. To that end, fans with filters 76 provide clean air to the interior of the inspection housing. FIG. 3 also schematically shows image analysis means 77 that is connected to the cameras to receive the lens images therefrom and to analyze those images to determine whether the lenses are acceptable or unacceptable.

Figure 4:
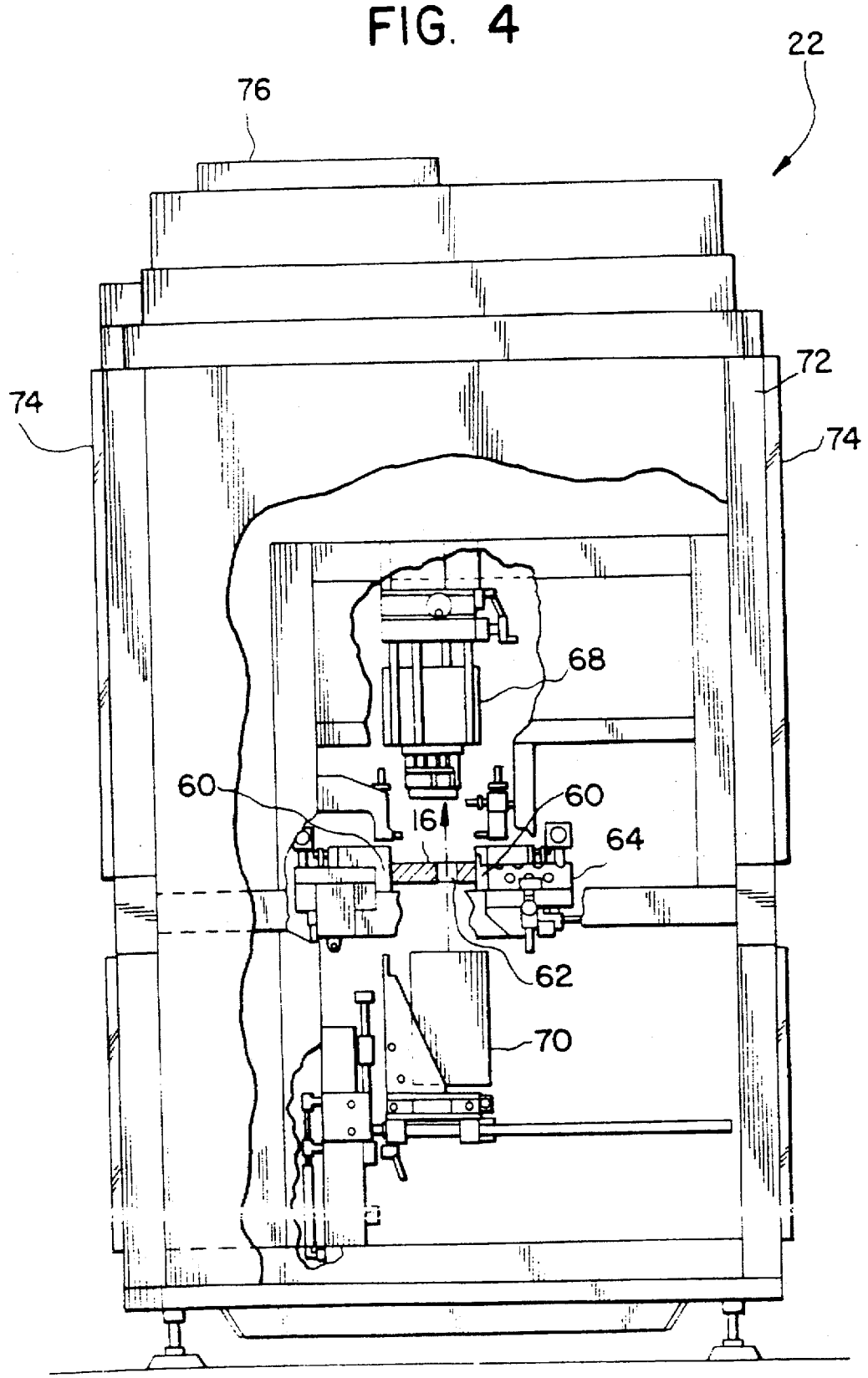
FIG. 4 is an end elevational planar view of the apparatus of FIG. 3.

Turning now to FIG. 4, an end planar elevational view of the apparatus described above is shown. In addition there is shown the path by which light travels from strobe lamp 70 through pallet 16 to the camera assembly 68.

In use, lenses would move past the inspection system at a speed of between 30 mm/sec to 50 mm/sec. With lenses on the pallet having a pitch of between 30 and 50 mm and preferably 35 mm, lenses can be inspected at the rate of about 1 per second. Although a time of 0.2 seconds required to grab the video frame is not limiting, processing time can reasonably be expected to be somewhat greater, on the order of 2.5 sec to 3.0 sec. In order to maintain the desired overall inspection rate, multiple processors are used to alternately analyze the video images that are captured.

As is readily apparent to one skilled in the art, many variations on the above described embodiment are possible. The above description is exemplary only and not to be construed as limiting the scope of the invention, which is defined in the claims that follow.

We claim:

1. An apparatus for the inspection of ophthalmic lenses comprising:
   a lens pallet having wells for receiving, at a lens container receiving area, a plurality of lens containers for holding a plurality of ophthalmic lenses,
   an inspection station including a lamp for illuminating the lenses and the lens containers, and a camera for capturing an image of the lenses produced during illumination of the containers, image analysis means connected to the camera to receive the images of the lenses from the camera, to determine whether individual ones of the lenses are acceptable or unacceptable, and to produce signals identifying said individual ones of the lenses as acceptable or unacceptable, a lens disposition mechanism connected to the image analysis means to receive the signals therefrom and, in response to said signals, to remove the lens containers from the pallet and to physically separate acceptable lenses from unacceptable lenses, a conveyor for transporting the pallet in a first direction from the lens container receiving area to the inspection station then to the lens disposition mechanism, a pallet restraining means for minimizing movement of the pallet in directions other than the first direction, and means for returning the pallet from the lens disposition mechanism to the container receiving area.

2. The apparatus of claim 1 wherein said lens containers are lens packages, and said apparatus further comprises a package sealing station.

3. The apparatus of claim 2 further comprising a saline dosing station between the inspection station and the package sealing station.

4. The apparatus of claim 1 wherein the apparatus further comprises a sensor responsive to a triggering means on said pallet, the sensor electrically connected to the lamp for initiating the illumination.

5. The apparatus of claim 1 wherein the pallet wells for receiving a plurality of lens containers comprise holes passing through the pallet from a bottom pallet surface to a top pallet surface.

6. The apparatus of claim 5 wherein the inspection station is so arranged that a pallet at the inspection station has the lamp located beyond the plane of one of the pallet top and bottom surfaces, the camera is located beyond the plane of the other surface, and the illumination of the lens takes place along a path through the holes in the pallet.

7. The apparatus of claim 1 wherein the pallet further comprises side walls and top and bottom surfaces, wherein the side walls are substantially perpendicular to the top and bottom surfaces, and the pallet restraining means comprises mechanical bias means located on the side walls and the pallet restraining means further comprises guide rails on the conveyor which are positioned to compress the pallet mechanical bias means when the pallet is between the guide rails.

8. The apparatus of claim 7 wherein the pallet comprises an engagement means and the conveyor comprises a drive means for engaging the pallet engagement means and transporting the pallet.

9. The apparatus of claim 1 wherein the pallet further comprises locating means and the lens container further comprises a mating locating means, the locating means and the mating locating means capable of interlocking to retain the container on the pallet while transporting by the conveyor.

10. Apparatus according to claim 1, wherein the lens disposition mechanism, in response to the signals from the image analysis means, removes the acceptable lenses from the pallet and transfers the acceptable lenses to a first location, and removes the unacceptable lenses from the pallet and transfers the unacceptable lenses to a second location.

11. Apparatus according to claim 10, wherein the lens disposition mechanism removes from the pallet all of the lens containers held therein.

12. The apparatus of claim 1, wherein said conveyer is a precision conveyor which enables movement of the pallets in the first direction with a pallet movement tolerance of 0.30 mm in other directions.

13. A method of inspecting ophthalmic lenses for use with a movable pallet having a plurality of wells, said method comprising:

providing a pallet conveying means which is capable of transporting the pallet in one direction and capable of restraining movement in other directions, placing lens containers into the wells of the lens pallet at a container receiving area, placing ophthalmic lenses into the lens containers, transporting the pallet from the container receiving area to an inspection station comprising a lamp and a camera, illuminating the lenses and the containers with the lamp, and capturing with the camera images of the lenses produced during illumination of the lens containers, determining whether lenses contain nonconformities from the images received from the camera, producing, in response to said determination, signals identifying lenses as acceptable or unacceptable, transporting the pallet from the inspection station to a lens disposition mechanism, dispositioning the lenses at the lens dispositioning mechanism consistent with said signals by removing the lens containers from the pallet and physically separating acceptable lenses from unacceptable lenses, and returning the pallet from the lens disposition mechanism to the container receiving area.

14. The method of claim 13 wherein the unacceptable lenses are separated from that which are acceptable by removing the lens containers with the unacceptable lenses from the pallet.

15. The method of claim 14 wherein removal of the unacceptable lens from the pallet includes removal of the lens containers in which the lenses are reposed.

16. The method of claim 13 wherein the illumination of the lens containers and capturing of lens images occur by passing light through the lens containers, lenses, and holes in the pallet well.

17. The method of claim 13 wherein the illumination of the lenses comprises sensing a triggering means on the pallet, wherein the sensing initiates energy being provided to the lamp.

18. The method of claim 13 wherein said lens containers are the lens packages, the method further comprising the step of sealing the packages with a foil.

19. The method of claim 18 further comprising dosing the packages with saline after determination of acceptability but before sealing the packages.

20. A method according to claim 13, wherein the dispositioning step includes the steps of, in response to said signals, removing the acceptable lenses from the pallet and transferring the acceptable lenses to a first location, and removing the unacceptable lenses from the pallet and transferring the unacceptable lenses to a second location.

21. A method according to claim 20, wherein the dispositioning step further includes the step of removing from the pallet all of the lens containers held therein.

22. The method of claim 13, wherein the step of providing the pallet conveying means restrains pallet movement in the other direction to a tolerance of 0.30 mm.

* * * * *